United States Patent

Bisgaard et al.

[11] Patent Number: 5,386,476
[45] Date of Patent: Jan. 31, 1995

[54] LOCKING DEVICE FOR A HEARING AID BATTERY CHAMBER

[75] Inventors: Nikolai Bisgaard, Lyngby; Jorgen Hartmann, Glostrup, both of Denmark

[73] Assignee: GN Danavox A/S, Taastrup, Denmark

[21] Appl. No.: 105,013

[22] Filed: Aug. 10, 1993

[30] Foreign Application Priority Data

Aug. 28, 1992 [DK] Denmark .............................. 9200109

[51] Int. Cl.$^6$ ............................................. H04R 25/00
[52] U.S. Cl. ..................................... 381/69; 381/69.2; 381/23.1
[58] Field of Search ........................ 381/69.2, 68, 68.6, 381/69, 23.1; 179/107 R; 429/98

[56] References Cited

U.S. PATENT DOCUMENTS 3,828,142  8/1974  Buttner .
4,565,904  1/1986  Harada ................................ 381/69.2
4,870,688  9/1989  Voroba et al. ..................... 381/69.2

FOREIGN PATENT DOCUMENTS 794347  7/1954  United Kingdom .

Primary Examiner—Curtis Kuntz
Assistant Examiner—Sinh Tran
Attorney, Agent, or Firm—Merchant, Gould, Smith, Edell, Welter & Schmidt

[57] ABSTRACT

A device for a battery chamber (2) in a hearing aid (1) with replaceable battery (3) comprises a locking device for blocking the battery chamber. The locking device comprises a displaceable pin, which can be maneuvered through an opening (7) in the battery chamber by means of a pointed or thin object, e.g. a mandrel-shaped tool or the like.

3 Claims, 3 Drawing Sheets

LOCKING DEVICE FOR A HEARING AID BATTERY CHAMBER

BACKGROUND OF THE INVENTION

The innovation relates to a device for a battery chamber or for a battery cover in a hearing aid with replaceable battery.

During the latest decades behind-the-ear as well as in-the-ear hearing aids have been made continuously smaller, which has resulted in the development of very small batteries. Today even very small batteries have been developed, which nevertheless have sufficient electric capacity for operating a hearing aid. However, the battery must be replaced by a new battery or by a rechargeable battery at intervals, e.g. daily or at intervals of a few days depending on the power consumption of the hearing aid and on the manner in which the user uses the hearing aid.

To simplify the replacement process many hearing aids have a battery chamber or a battery cover, which is configured in such a manner that the battery is placed herein and tipped or displaced into its place in the hearing aid. As the hearing aids as well as the batteries are very small today, hearing aids are to a great extent designed in such a manner that the replacement process is simplified and often in such a manner that the battery cannot be turned the wrong way. Among hearing aid users there are today persons of all ages, i.e. also quite a number of children and quite a number of elderly people. Consequently, it is essential that the battery in a hearing aid may be replaced easily and quickly.

From GB patent no. 794,347 is known a hearing aid-so-called hearing spectacles-where the battery drawer in each side bar is blocked by a blocking member in the form of a small leaf spring being maneuvered by means of a thin object through a small hole in the cover. The blocking member cannot be disengaged function-wise, if the user does not want to use it, as it also constitutes the member which keeps the battery drawer closed. It is moreover disadvantageous to use a metal spring, as its function may be reduced or completely disappear by too heavy impacts.

As to the known hearing aid, the battery cannot be removed without using a suitable, thin object, e.g. a thin steel wire, a needle or the like, or without knowing how to open the battery chamber by means of the object. Children are hereby prevented from removing the battery themselves, as the battery is replaced by the child's parents or others who are looking after the child. Thus, the child is not in direct contact with and cannot misuse the battery, e.g. put it in its mouth and swallow it. The construction moreover ensures that persons other than children, who are unable to administer the replacement of batteries themselves, are prevented from replacing or removing batteries from hearing aids.

ADVANTAGES OF THE INNOVATION

Among other things the hearing aid according to the innovation the advantage that the locking device can be disengaged, if so desired, after which the battery chamber or the battery cover can be operated in the usual manner. Construction-wise the locking device is moreover simple and can be designed to require minimum space, which of course is very essential, especially with the small hearing aids of today.

By designing the device according to the innovation, a construction is achieved, which is easily built into an ordinary hearing aid irrespective of the type, i.e. a behind-the-ear hearing aid, an in-the-ear hearing aid or a hearing aid to be carried on the body.

By designing the innovation, the locking device is constructed in such a manner that the movable part remains in its position and is only moved by means of the tool. It is hereby avoided that blows and other mechanical impacts on or with the hearing aid displace the movable part. Consequently, the battery chamber or the battery cover cannot be opened unless the tool or a similar instrument is correctly used, if the locking device is in operation. However, the locking device can simply be disengaged, if so desired, and the battery chamber or battery cover can be operated in the usual manner.

The innovation also relates to a special tool as disclosed in the characterizing part of claim 8. The tool has the advantage that it ensures operation of the locking device in the hearing aid without damaging said device in any way. The tool can moreover be secured, e.g. in a key ring or the like, so that the user will always know where it is. The tool is preferably cast in one piece of a suitable plastic material.

THE DRAWING

An embodiment example according to the innovation will be explained in closer detail in the following with reference to the drawing, where FIG. 1 shows a part of a hearing aid with a device according to the innovation, FIG. 2 shows the same as FIG. 1, but with the battery chamber partially open, FIG. 3 shows a plane section in FIG. 2 along III—III, FIG. 3A shows a magnified view of structure circled in FIG. 3, FIG. 4 shows a plane section in FIG. 2 along IV—IV, FIG. 4A shows a magnified view of the structure circled in FIG. 4, FIG. 5 shows a locking pin on a larger scale, and FIG. 6 shows a tool for operating the device according to the innovation.

DESCRIPTION OF THE EMBODIMENT EXAMPLE

Figure 1:
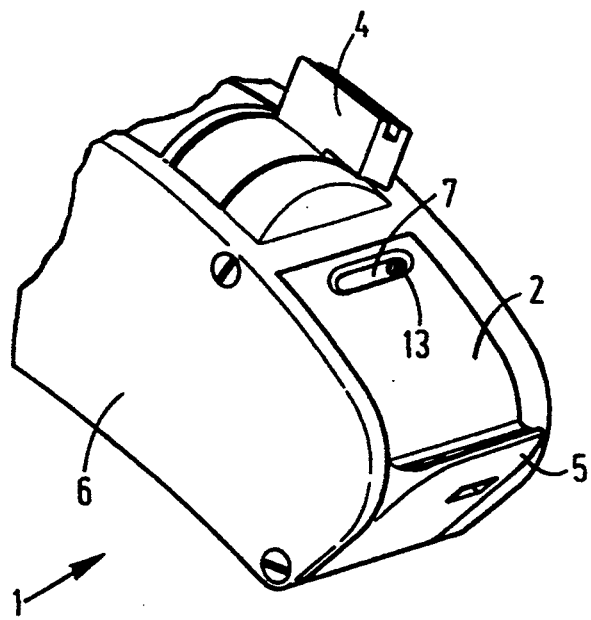
Figure 2:
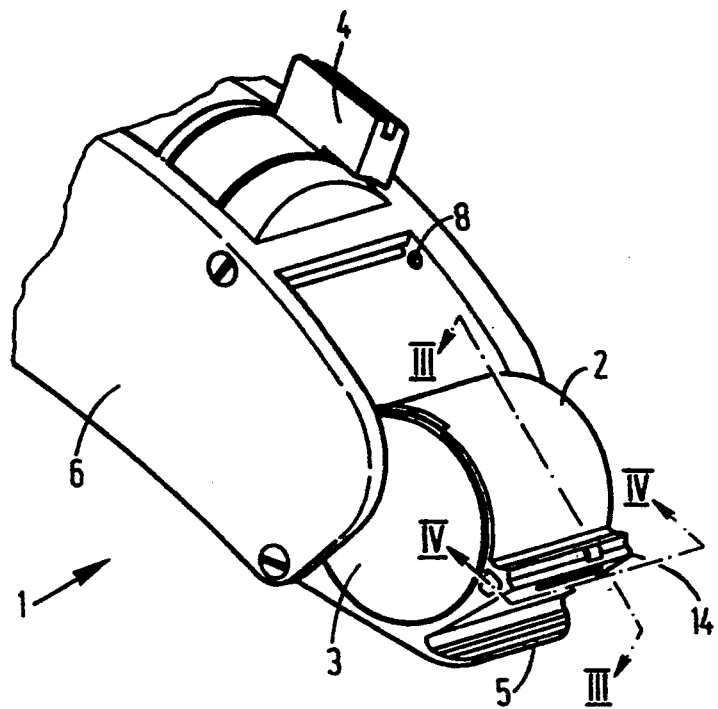

FIGS. 1 and 2 show a part of a behind-the-ear hearing aid namely the part which is facing downwards during use, and which contains a battery 3 in a battery chamber 2. The battery chamber 2 is turned around an axis or a hinge by means of a grip 5. When the battery chamber 2 is completely free of the sides 6 of the hearing aid, the battery 3 can be replaced. Additionally, the hearing aid usually has a switch 4 and a number of adjustment members (not shown). As the innovation can be applied in or in connection with any type of electric or electronic hearing aid, there is as an example only shown a part of a hearing aid.

In the embodiment shown, the battery chamber 2 has a thickened area 14 for snap-engagement with the edge of the battery chamber, which for example can be designed as shown in the drawing with a cross part between the sides 6 of the hearing aid.

A locking device or a pin is designed for locking or blocking the battery chamber, which device can be maneuvered through an opening 7 in the battery chamber 2, which pin can enter into engagement with a blind hole 8 or the like provided at the side on the inside of the hearing aid, see FIG. 2. Naturally, there is nothing to prevent the locking pin and the opening 8 from changing places, so that the movable locking pin and the opening 7 are placed in the hearing aid and the blind hole 8 in the battery chamber 2.

Figures 3A, 3B:
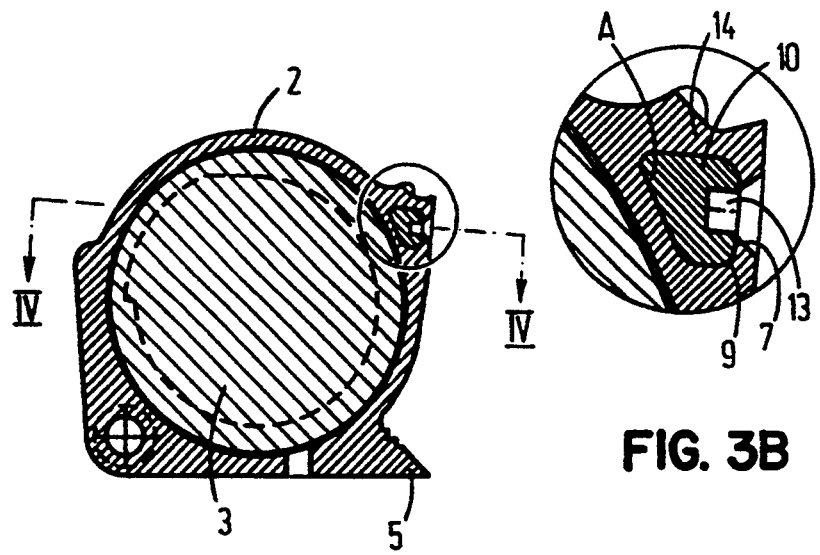

The sectional drawings, FIGS. 3 3A, and 4, 4B, show in closer detail a preferred embodiment for the design of the locking pin 10 and a transverse hole 9 in the battery chamber. The transverse hole 9 is made in the thickened part 14 and has a cross-sectional profile as shown in FIG. 3. Friction-wise the locking pin 10 and the hole 9 are made in such a manner that the pin 10 can only be displaced by means of a tool 18 or the like, see FIG. 4. The hole 9 is preferably a blind hole with a further opening 15 allowing a point or a projection on the locking pin 10 to pass and enter into engagement with the blind hole 8 in the hearing aid housing.

The hole 9 is blocked by means of a plug 11 or the like, partly to prevent the locking pin from being removed, and partly to avoid dirt etc. from collecting.

The locking pin is maneuvered by means of a mandrel-shaped tool 18 having a pointed or dowel-shaped part 20. The tool is shown in FIG. 6 and the use of the tool is shown in FIG. For the tool 18 to be able to engage with the locking dowel 10, the dowel is designed with a blind hole 13, which can be reached with the tool through the opening 7, which is funnel-shaped in order to facilitate the introduction of the tool.

Figure 5:
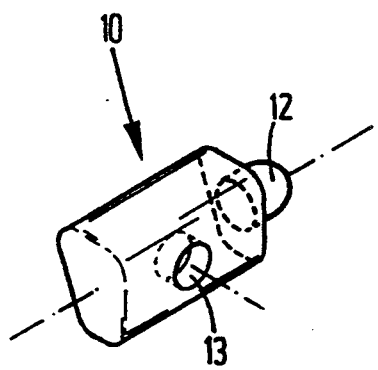

In the embodiment shown, the cross-sectional profile of the locking dowel 10 is unsymmetrical in order to utilize the already thickened area 14 without having to make this area larger. In FIG. 5 the locking dowel 10 is shown on a larger scale and cast in one piece in plastic, e.g. in Hostaform POM plastic, which has suitable frictional qualities.

Figure 6:
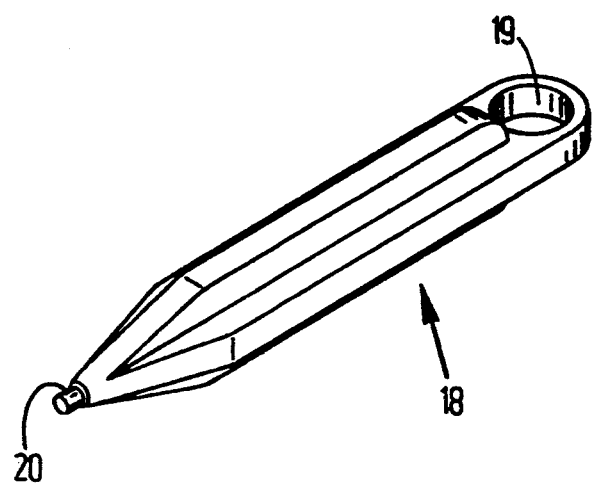

The tool or key 18 is shown in FIG. 6 and comprises a handle, the one end being designed with a projection 20 and the other end with an eye or the like 19 for the tool to be secured in a key ring or the like.

It will be obvious to a person skilled in the art that the device according to the innovation and the tool 18, likewise according to the innovation, can be designed in many other ways without deviating from the basic idea.

We claim:

1. In a battery operated hearing aid, said hearing aid including a battery housing, said hearing aid comprising:
    a) a chamber attached to said battery housing for receiving and holding a battery, said chamber being movable between a first position closing said battery housing, and a second position, where said battery housing is open;
    b) means for locking said chamber in said first position, said means for locking including a displaceable pin, said displaceable pin including a body, a means for receiving a tool and a projection, said projection having a smaller diameter than said body, said displaceable pin slidably attached to said chamber and a means in said battery housing for engaging said displaceable pin; and
    c) means for captively holding said displaceable pin in a slidable engagement in said chamber, said means for captively holding said displaceable pin additionally including, a thoroughgoing bore for allowing said projection of said displaceable pin to pass through said means for captively holding said displaceable pin and into engagement with said means for engaging said displaceable pin in said battery housing, and an opening, said opening providing access to said means for receiving a tool in said displaceable pin.

2. The hearing aid of claim 1, wherein when said tool engages said means for receiving a tool, said displaceable pin is moved.

3. The hearing aid of claim 1, wherein said opening is funnel-shaped.

* * * * *

UNITED STATES PATENT AND TRADEMARK OFFICE
CERTIFICATE OF CORRECTION

PATENT NO.   :   5,386,476

DATED        :   January 31, 1995

INVENTOR(S)  :   Nikolai Bisgaard, et al.

It is certified that error appears in the above-identified patent and that said Letters Patent is hereby corrected as shown below:

In column 1, line 60, insert --has-- after "innovation".

Figures 4A, 4B:
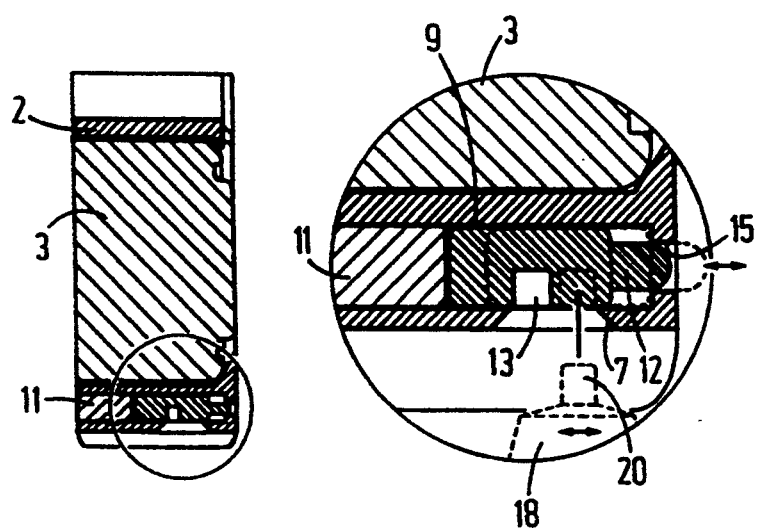

In column 2, line 33, "Fig. 3 shows" should be --Fig. 3A-3B show--;

line 36, "Fig. 4 shows" should be --Fig. 4A-4B show--; and line 48, insert --1-- after "aid".

In column 3, line 6, "3 3A and 4, 4B" should be --3A-3B and 4A-4B--;

line 16, insert --12-- after "projection"; and line 26, insert --4A-4B-- after "FIG.".

Signed and Sealed this

Thirteenth Day of February, 1996

Attest:

BRUCE LEHMAN

Attesting Officer     Commissioner of Patents and Trademarks